United States Patent [19] [11] 3,909,625

Colglazier et al. [45] Sept. 30, 1975

[54] TOUCH ACTUATED ELECTRONIC SWITCH

[75] Inventors: David E. Colglazier, Minneapolis; Willis A. Larson, Wayzata, both of Minn.

[73] Assignee: Magic Dot, Inc., Minneapolis, Minn.

[22] Filed: July 30, 1973

[21] Appl. No.: 383,466

[52] U.S. Cl......... 307/116; 317/DIG. 2; 340/258 C; 328/5

[51] Int. Cl.² .......................................... H03K 13/00

[58] Field of Search ........... 307/117, 116, 205, 208; 340/258 C; 200/DIG. 1; 317/DIG. 2, 246; 328/1, 5

[56] References Cited

UNITED STATES PATENTS

| | | | |
|---|---|---|---|
| 3,103,655 | 9/1963 | Jones | 328/5 X |
| 3,573,783 | 4/1971 | Fudaley | 340/258 C |
| 3,668,660 | 6/1972 | Watten | 178/17 C |
| 3,787,732 | 1/1974 | Larson | 307/116 |

*Primary Examiner*—Robert K. Schaefer
*Assistant Examiner*—M. Ginsburg
*Attorney, Agent, or Firm*—Wicks & Nemer

[57] ABSTRACT

A touch actuated electronic switch is disclosed including at least one surface, accessible to the touch of a human, interconnected with differential sensing circuitry, in this application dual input logic circuitry. In the preferred embodiment where the interconnection between the logic circuit and the surfaces is desired to include long wires, a twisted pair of wires is used if increased noise immunity or noise protection is desired. The twisted pair is interconnected at one end with one wire electrically connected to the touch surface and the other substantially equal length wire being unconnected or connected to a second touch surface. Both wires are connected at their other ends to the dual inputs to the logic circuitry. A common mode alternating voltage signal is then provided through input circuitry to the logic circuitry, and the output of the logic circuitry is interconnected to an integrator, in the preferred embodiment a capacitor. The integrator is, in turn in the preferred embodiment, connected to an additional amplifier. The output terminals of the additional amplifier, in the preferred embodiment, act as an electrical switch with the electrical impedance across the output terminals in a first state assuming a high impedance, electrical open circuit, or "OFF" switch condition and in the second state assuming a low impedance, electrical short circuit, or "ON" switch condition to thereby approximate the two states of a conventional mechanical electrical switch, the condition assumed by the second amplifier being dependent upon whether or not an operator has touched a touch surface.

65 Claims, 3 Drawing Figures

TOUCH ACTUATED ELECTRONIC SWITCH

BACKGROUND

The present invention generally relates to switches, more particularly relates to electronic switches, and still more particularly relates to touch actuated electronic switches.

A touch actuated electronic switch which operates upon the mere touch of an operator and without moving parts is deemed desirable to replace mechanical switches in substantially all switch applications.

Further, a touch actuated electronic switch which can be inexpensively fabricated, which can be fabricated in small size, which is reliable, which provides a high noise suppression or immunity, which is easily fabricated, and which operates upon input currents of a level below that dangerous to humans is to be desired.

The present invention provides a switch having these and other advantages.

SUMMARY

The preferred embodiment of a touch actuated electronic switch of the present invention includes two touch surfaces interconnected by a twisted pair of wires with the dual logic inputs of an exclusive OR logic circuit.

Also, in the preferred embodiment, a common mode voltage is provided from the conventional A.C. power lines to the dual inputs of the logic circuit. If the logic circuit is to be of the grounded variety, this common mode input may be provided by an electrical interconnection to the input power lines. If a switch of the floating variety is desired, this electrical interconnection can be provided, for example, by the electrical oscillation of the secondary winding of a transformer used in the power supply to the switch.

A partial shunt of this common mode input may also be used to increase noise immunity, in the preferred embodiment, in the form of a resistor across the dual inputs to the logic circuitry.

The output from the logic circuitry is then provided, in the preferred embodiment, to an integrating capacitor and to an additional amplifier with sufficient power capabilities to satisfy the needs of the electronic switch.

The use of a differential sensing circuit, in this case logic circuitry, in the switch of the present invention allows increased noise immunity or suppression and thus allows the use of long input wiring where desirable.

It is thus a primary object of the present invention to provide a novel touch actuated electronic switch.

It is a further object of the present invention to provide such a switch which may be easily fabricated.

It is a further object of the present invention to provide such a switch which may be inexpensively fabricated.

It is a further object of the present invention to provide such a switch which may be fabricated of small size.

It is a further object of the present invention to provide such a switch which is reliable.

It is a further object of the present invention to provide such a switch with high noise suppression or immunity.

It is a further object of the present invention to provide such a switch where sensitivity can be controlled without significant detriment to the switching characteristics.

It is a further object of the present invention to provide such a switch which allows the touch surfaces to be located remotely of the remainder of the switch.

It is a further object of the present invention to provide such a switch which allows an increased suppression of ambient signals unrelated to actuation of the switch.

It is a further object of the present invention to provide such a switch which can operate on input currents of a level below that dangerous to humans.

These and further objects and advantages of the present invention will become clearer in light of the following detailed description of an illustrative embodiment of this invention described in connection with the drawings.

DESCRIPTION

Figures 1, 2, 3:
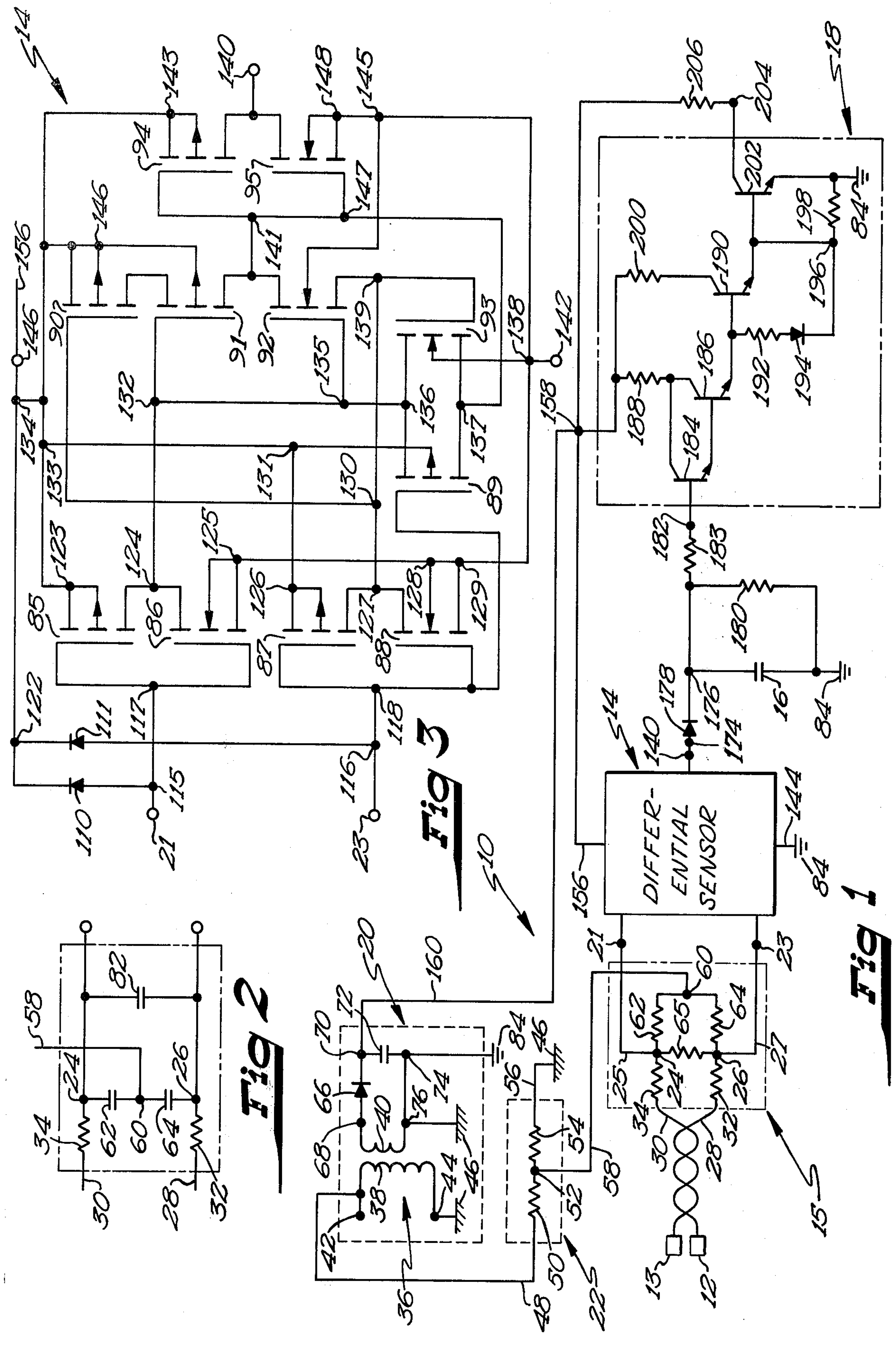
FIG. 1 shows a schematic/block diagram representation of a touch actuated electronic switch according to the present invention with various portions of the schematic enclosed within dashed and solid lines to indicate major functional blocks.
FIG. 2 shows an alternate embodiment of a portion of the circuitry of FIG. 1.
FIG. 3 shows a preferred embodiment of circuitry usable in the switch of FIG. 1.

In FIG. 1, the touch actuated electronic switch of the present invention, generally designated 10, is shown as including touch surfaces 12 and 13, a differential sensing block 14, input circuitry 15, an integrating means, in the form of a capacitor 16, and an additional amplifier block 18. A power supply providing power to the aforementioned parts is also shown as is a source of common mode alternating voltage signal, designated 22.

With more particularity, touch surfaces 12 and 13 are shown as connected to junction points 24 and 26 of input circuitry 15 to differential sensor 14, in this preferred embodiment an exclusive OR logic circuit. Wire 28 is electrically connected between touch surface 12 and junction point 26 through a resistor 32 inserted to assure a level of current below that dangerous to human as between touch surface 12 and the remaining electronics. Similarly, wire 30 is electrically connected between touch surface 13 and junction point 24 through a resistor 34 and is of substantially the same length as wire 28. The twisted pair 28 and 30 is used to obtain a better noise suppression or noise immunity in conjunction with differential sensor 14 when a long input connection is used between touch surfaces 12 and 13 and sensor 14.

Junction points 24 and 26 are then interconnected with the dual inputs 21 and 23 to sensor 14 by wires 25 and 27, respectively. Also connected to input circuitry junction points 24 and 26 is a common mode alternating voltage signal from blocks 20 and 22.

With more particularity, power supply 20 includes a transformer generally designated 36 having a primary winding 38 and a secondary winding 40. Primary winding 38 includes terminals 42 and 44 connected to a source of alternating frequency power with terminal 44 shown as connected to earth ground, designated 46.

Block 22 is also connected between terminals 42 of transformer 36 and earth ground 46, as by wire 48 having one end connected to terminal 42 and the other end connected to a voltage divider resistor 50. Resistor 50 in turn is connected to a junction point 52 also connected to an additional voltage divider resistor 54 which, in turn, is connected to earth ground 46 by a wire 56. Block 22 is then connected to junction points 24 and 26 by a wire 58 extending between junction point 52 within block 22 and a further junction point 60 within input circuitry 15 which, in turn is connected to junction point 24 through a resistor 62 and to junction point 26 through a resistor 64.

A means for providing an input signal shunt to sensor 14 is shown as resistor 65 connected across junction points 24 and 26.

Thus, input circuitry 15 includes resistors 32, 34, 62, 64, and 65, junction points 24, 26, and 60, and wires 25, 27, and 58.

The remaining parts of power supply 20 include a rectifying diode 66 connected between a first terminal 68 of transformer secondary 40 and a junction point 70 also connected to one side of a filtering capacitor 72. The other connection to capacitor 72 is made to a junction point 74 which is also connected to another terminal 76 of transformer secondary 40 and to earth ground 46.

Sensor 14, in the preferred embodiment, is a conventional exclusive OR gate formed of complementary logic gates such as the number MC14507AL or MC14507CL exclusive OR circuitry currently sold by Motorola Semiconductors which uses MOS P-channel and N-channel enhancement mode semiconductors. Since this logic cell is of the standard type which may be identified as type 4030, it can be obtained from other manufacturers also. For example, RCA, solid state division, sells a model CD4030 series logic circuit successfully used. The Motorola unit is shown, however, and preferred.

Sensor 14, as seen in FIG. 3, then includes MOS devices 85–95, inclusive, and diodes 110 and 111 interconnected between inputs 21 and 23 and a logic output 140. A bias terminal 142 for logic circuit 14 is connected to circuit ground 84 by a wire 144, and a second bias terminal 146 is connected to a source of D.C. voltage from power supply 20, as available at junction point 70 by means of wire 156, junction point 158, and wire 160.

OUtput 140 of logic circuit 14 is then connected to a junction point 176 through a diode 178 having its anode connected to junction point 174 and its cathode connected to junction point 176. Junction point 176 is further connected to circuit ground 84 through a parallel connection of capacitor 16 and a resistor 180. Junction point 176 is also connected to the input 182 of amplifier 18 through a resistor 183.

Amplifier 18 includes a Darlington arrangement of NPN transistors 184 and 186 having their common collectors connected to junction point 158 through a current limiting resistor 188. The base of transistor 184 is connected to amplifier input 182, while the emitter of transistor 186 is connected to the base of a further NPN transistor 190 and to circuit ground 84 through a series connection of resistor 192, diode 194, junction point 196, and resistor 198. The collector of transistor 190 is also connected to junction point 158 through a further current limiting resistor 200. Junction point 196 is also connected to the emitter of transistor 190 and to the base of a further NPN transistor 202 which has its collector connected to output 204 of amplifier 18 and its emitter connected to circuit ground 84.

The load resistor for the present invention is generally designated 206 and shown as connected between output 204 and junction point 158. It will be recognized by those skilled in the art that load resistor 206 may represent an actual resistor or any other electronic load for the switch 10 of the present invention. Depending upon the current requirements of the actual load required to be switched, as represented by load resistor 206, the precise configuration of the electronic switch of the present invention will be set.

That is, while the switch will always include differential sensor 14 having differential inputs, the precise configuration and number of stages will be dictated by the current requirements and nature of the load. Explained further, since the input current desired to be utilized is below the threshold found harmful to humans, i.e. below 1 microamp, the configuration and number of stages necessary to sense and amplify this current reliably and provide the desired output current to load 206 will simply be the number of stages required to provide whatever output current is desired from the preferred low level input current available. Therefore, the configuration of logic circuit 14 may change radically, as by changes in the number of stages or in the addition of preamplifying buffers generally in response to output current requirements. Also, the exact configuration of amplifier 18 will change with changing requirements on the switch and may not be required at all.

Preferred values for various of the components of the switch 10 of the present invention may now be given. The voltage provided by power supply 20 is of a polarity and value compatible with the remainder of the circuit. In the preferred embodiment shown, a voltage at junction point 70 is shown as positive with respect to circuit ground 84 and of a value of 15 volts. No limitation whatever to this polarity or value is intended.

Further, as a general comment, while preferred values of electronic components are given hereinafter, it will be realized by those skilled in the art that no limitation to these values is intended unless specifically indicated. The values are given as a guide and as an aid to persons lawfully using and utilizing the present invention.

The value of resistors 32 and 34 are in the megohm range and, as indicated, are intended to protect the user of the touch surfaces from any possible electrical shock hazard, electrical insulation breakdown, or the like. Resistors 32 and 34 further protect the circuitry of the present invention from damage from voltages existing upon a user, for example static electricity charges. Thus the minimum value of these resistances is dictated by both considerations. Maximum values are dictated by practicality of manufacture and by consideration of the currents to be expected through these resistors such that these resistors do not unduly limit input currents.

Resistor 62 and 64 are in the range of 100 kilohms to 300 megohms with a preferred value in the area of 2.2 megohms to 300 megohms, depending on the switch sensitivity desired. With a low value of resistance, a lower differential signal input is provided to actuate the switch, as will be explained in further detail hereinafter, thus resulting in a lower switch sensitivity. Conversely, a higher value of resistors 62 and 64 allows a higher differential signal which is then available to actuate the switch, thus resulting in a higher switch sensitivity.

Switch sensitivity is to be taken in its normal sense of the amount of input signal required to obtain an output from the switch, with a switch of low sensitivity requiring a higher input signal to obtain an output and a switch of high sensitivity requiring a lower input signal to obtain an output. Applied to the switch of the present invention, a high sensitivity would allow the switch to be operated, for example, with a gloved hand, or at a slight distance from the touch surfaces 12 and 13. Thus, for the purposes of the present applications, the word "touch" is not intended to be limited to actual physical contact of an operator's body with the touch surfaces, but only an approach of the operator's body sufficiently close to the touch surface, while not necessarily contacting the surface, to allow an actuation of the switch. As can be seen, the degree of approach required to actuate is directly related to the sensitivity of the switch.

Resistors 50 and 54 are for voltage division of an alternating voltage signal and are generally in the range of 10 kilohms into the megohm area, depending upon impedance levels, as is well known to those skilled in the art. Also, block 22 including these resistors may take other forms and yet provide the common mode signal requirements of the present invention. These other forms may embody a transformer with an output at the desired voltage, a voltage tap on transformer 36 of power supply 20, a large series resistor to reduce voltage and current to desired values, an oscillator, or the like.

Resistor 65, in the preferred embodiment is in the megohm range, as will be discussed further hereinafter.

The values of capacitor 16 and resistor 180 are chosen to have a time constant, i.e., the product of the value of the capacitance multiplied by the value of the resistance, which is significantly greater than the period of the alternating voltage signal applied at junction point 60 of input circuitry 15. Thus, for a preferred and assumed frequency of 60 hertz, as discussed below, a value of capacitor 16 of approximately 4,000 picofarads and a value of resistor 180 of 20 megohms yielding an approximate RC time constant of 80 milliseconds has been found to be appropriate. Generally, since the switch of the present invention is designed to be fabricated by integration or thick film techniques, the value of capacitor 16 is chosen sufficiently small to allow such fabrication. The value of resistor 180 is then chosen to be compatible with the chosen value of capacitor 16 according to the above set out constraints.

The alternating frequency for which all values are given is 60 hertz, the conventional power line frequency available without effort in most locations. Other frequencies may be used, both higher and lower than the 60 hertz indicated, with the limitations on frequency arising from availability of a source of oscillation, the desirability of integrating the switch on a substrate, and other limitations more well-known to designers in the art.

Amplifier 18 is discussed in detail in prior applications by the present inventors. Amplifier 18 may also be many other conventional amplifiers providing the current requirements of the switch, as discussed herein, including MOS amplifiers or logic buffers.

The alternating voltage input desired is of a broad range depending upon the sensitivity desired, as will be explained further hereinafter. For the 60 hertz frequency of the preferred embodiment, voltages in the range of four to 150 volts peak to peak have been used successfully.

OPERATION

Basically, the switch 10 of the present invention operates upon the touch of surfaces 12 or 13 by an operator. The capacitance of the operator's body, found to be approximately 50–100 picofarads, provides an unbalanced or differential input signal to differential sensor 14 which affects the charge of capacitor 16. The charge of capacitor 16 then affects the state of amplifier 18 such that the electrical impedance between terminals 204 and circuit ground 84 take a first state assuming a high impedance, electrical open circuit, or OFF switch condition or a second state assuming a low impedance, electrical short circuit, or ON switch condition to thereby approximate the two states of a conventional mechanical electrical switch, with the condition assumed by the impedance between terminals 204 and 84 being dependent upon whether or not an operator has touched surfaces 12 or 13.

More particularly, common mode block 22 provides an alternating voltage common mode signal to both inputs 21 and 23 of differential sensor 14, through input circuitry 15. It is a well-known characteristic of an exclusive OR logic circuit that an output is provided by the circuit at any time when the signal inputs provided differ by an amount exceeding the voltage threshold of the circuit. For the MOS circuit shown in FIG. 3, the threshold is approximately one-half of the voltage applied across terminals 142 and 146.

Thus, if no signal whatever is provided to inputs 21 and 23, a logical "0" is provided by sensor 14. Similarly, and more to the point with regard to the present application, a balanced alternating voltage signal applied to inputs 21 and 23 will also result in a logical 0 output. Notice that the signal must not only be balanced in amplitude, but in phase, a characteristic which is used in operating according to the present invention. Notice further that the exact voltage polarity which is associated with a logical 0 or a logical "1" may vary with manufacturers, and is not a factor in the present invention since the exact polarity will only reflect in the design of the succeeding stages and not change the inherent function of the succeeding stages. Note also that because an exclusive OR circuit is used, there is no difference in the output provided at output 140 if the voltage applied to input 21 exceeds or is less than the voltage applied to input 23. In either case, sensor 14 provides a logical 1 of the same polarity at output 140.

Assuming sensor 14 is in a quiescent state, with the alternating voltage signal applied to input circuitry 15 balanced with respect to the differential inputs 21 and 23, the quiescent voltage at output 140 of sensor 14 is either near the supply voltage appearing at junction point 146 or near the voltage appearing at circuit ground 84. In the preferred circuitry of FIG. 3, the quiescent voltage is near circuit ground 84. Thus, no voltage appears across capacitor 16, and it is uncharged. With no voltage across capacitor 16, no input is provided to amplifier 18 and thus the impedance between amplifier output 204 and circuit ground 84 is substantially an open circuit. In this state, the switch may be considered in an OFF condition.

The particular state of the impedance between output 204 and circuit ground 84 may, however, be controlled to either condition, as by selection of a differential sensor 14 wherein the quiescent condition of output 140 is near the supply voltage appearing at terminal 146. This quiescent condition would result in bias to amplifier 18, and render transistor 202 conducting to thus provide an electrical short circuit across amplifier output 204 and circuit ground 84. Thus, either normal switch condition can be designed as the quiescent condition for the switch of the present invention.

Thus, this flexibility in the components of switch 10 of the present invention allows it to exist in either an ON or OFF switch condition indicated above before the operator's touch and the inverse switch condition after the operator's touch. Further, by appropriate latching or other feedback, the switch 10 of the present invention can be made as a latching switch or any other switch configuration rather than the momentary switch discussed herein.

Assuming a quiescent condition for switch 10 with transistor 202 of amplifier 18 nonconducting and presenting substantially an open circuit between amplifier output 204 and circuit ground 84, the operator's touch or approach at one of surfaces 12 or 13 provides a capacitance between one of the dual inputs 21 and 23 of sensor 14 and ground 46. This additional capacitance unbalances the phase of the alternating voltage signal applied through junction point 60 as it is applied to sensor inputs 21 and 23.

More particularly, assuming that the operator's body provides a capacitance between touch surface 12 and ground 46, this capacitance would appear as between sensor input 23 and ground 46. Assuming the grounded version of the switch 10 of the present invention where earth ground 46 is connected to circuit ground 84, the phase angle of the alternating voltage signal applied to input 23 from block 20 is caused to lag the phase of the alternating voltage signal applied to input 21. Thus, assuming a sufficient phase difference is created, at particular points in each cycle of the applied alternating voltage signal, the difference between the voltage applied to input 21 and that applied to input 23 will differ by an amount exceeding the threshold voltage for the exclusive OR circuit, and an output will be provided in the form of a series of pulses of a width indicating the time during which the threshold condition was exceeded.

Thus, due to the phase shift of the present invention, the train of pulses appearing at output 140, during the times at which the threshold for sensor 14 is exceeded, charge capacitor 16, and the charge upon capacitor 16 in conjunction with resistor 183 appears as a current source to amplifier 18. This input current renders the transistors within amplifier 18 conducting and causes a change of state in switch 10 such that the impedance across amplifier output 204 and circuit ground 84 changes from a high impedance to a low impedance condition.

The manner in which the values of the components are selected for the switch 10 of the present invention may now be explained.

A primary consideration is to provide alternating voltage signals to the dual differential inputs 21 and 23 of sensor 14 which are substantially balanced. This balance is controlled by the values of resistors 62 and 64. Therefore, resistors 62 and 64 have values which are balanced to provide the substantially balanced alternating voltage signal to inputs 21 and 23 of logic circuit 14.

This does not mean that resistors 62 and 64 must be exactly balanced because other circuit parameters, such as the input circuitry of differential sensor 14, may in fact require a slight imbalance. This has been found to be true of the RCA CD4030 series of exclusive OR gates, where one input has a transmission gate in series with the logic. For circuits such as that disclosed in FIG. 3, and assuming other parameters are normally balanced, using resistors of a ten percent tolerance and equivalent resistive rating has been found to result in substantial balance for the switch 10 of the present invention with the inclusion of resistor 65, as discussed below.

The preferred order of design is then to first select a value of resistors 62 and 64 as dependent upon the sensitivity desired, as defined above. Sensitivity, for a capacitive switch, is preferred to be the lowest sensitivity acceptable for the switch application because of the possibility of inadvertant or undesired switch actuation.

If a high sensitivity is desired such that the switch 10 of the present invention can be operated from a gloved hand, at a close approach of the operator or another object, or the like, then the value of resistors 62 and 64 is selected nearer the 300 megohm value given above, assuming the other parameters are as stated. Assuming a lower sensitivity is required to avoid any possibility of an undesired actuation of the switch and an actual firm touch of the operator's finger upon one of touch surfaces 12 or 13, a value nearer five megohm would be selected. The exact value of resistors 62 and 64 depends upon the particular configuration of sensor 14, the length of input wires 28 and 30, the value of the supply voltage available at junction point 70, the value of the alternating voltage signal available at junction point 52, and like considerations which dictate that no actuation of the switch occurs in the quiescent state.

Next, in the preferred order of design, the amplitude of the alternating voltage signal is selected. The amplitude is selected by considering the available voltage, as whether the full 150 volt peak to peak normal line voltage is available, only a lower value transformer voltage is available, or whether an artificial voltage must be created. Cost and access to such voltage is a definite factor in any design, since the switch 10 of the present invention should be compatible with the remaining circuitry or other device switched.

Generally, with the practical conditions indicated above in mind, the amplitude of the alternating voltage signal is selected as a fine tuning on switch sensitivity. That is, with a higher voltage, a higher switch sensitivity results because more voltage is available across resistors 62 and 64. Conversely, with a lower value of alternating voltage signal from block 22, a lower switch sensitivity results. Note that the adjustment of alternating voltage signal amplitude is a second order effect to the values of resistors 62 and 64 themselves.

Next, in an original design with newly selected components, it is desirable to check the circuitry for stability, i.e., whether a quiescent condition can indeed be maintained, or whether random actuations of the switch occur from imbalances in resistors 62 and 64, the length of input wiring 28 and 30, other imbalances in the circuit, and like conditions. If a slight imbalance is noted, resulting in a series of rather narrow width spikes at the frequency of the alternating voltage signal, it has been found that the inclusion of resistor 65 across junction points 24 and 26 will bring the switch 10 of the present invention into a stable quiescent condition.

Resistor 65 is considered to have a dual function in allowing a better balance of the alternating voltage signal applied and as a further fine tuning on the sensitivity. Resistor 65 is considered to desensitize the inputs to a degree to allow for a balanced condition over a wide range of amplitudes of the alternating voltage signal and further to allow for more imbalance in the values of resistors 62 and 64. As can now be seen, if the remainder of the circuit is in complete balance, including the values of resistors 62 and 64, resistor 65 would not be needed since the amplitude of the alternating voltage signal could be used as a fine sensitivity adjust. Also, resistor 65 may not be needed with the circuit of FIG. 3 if the supply voltage to sensor 14, as across terminals 144 and 146, is sufficiently high as to provide a significant threshold for the switch 10.

As a specific example of an operable switch within the ranges indicated above, using the circuitry shown in FIGS. 1 and 3 with resistors 62 and 64 of a value of 22 megohms, a value of resistor 65 of 3.3 megohm, and an amplitude of the alternating voltage input of 150 volts peak to peak, a very stable switch results which will allow a length of twisted pair wires 28 and 30 to 100 feet and will require an actual touch of a surface 12 or 13 to provide an actuation of the switch. A value of resistor 65 of 1 megohm can also be used to provide a stable switch. At a value of resistor 65 of approximately 10 megohms, sporadic nonactuated actuation of the switch was noticed in some units.

It is to be noted that the switch 10 of the present invention allows a significant length of wire for twisted pair inputs 28 and 30, in complete contradistinction to many switches of its class known heretofore. This would allow, for example, a hand-held tool to support only touch surfaces 12 and 13 and have the remaining portions of switch 10 adjacent the circuitry or device to be controlled. The limitation on the length of wire tolerable is related to the sensitivity desired, and ultimately to the capacitance of the human to be sensed. It will now be understood by those skilled in the art that if wires 28 and 30 are excessively long, they present a capacitance which will so greatly exceed the approximately 100 picofarad value of the capacitance of the human as to mask the touch of the human and prevent actuation of the switch. Other like effects occur because of excessively long wires 28 and 30, such as those more well known to designers in the art.

It may also be desirable to remove one or more of the connections between circuit ground and earth ground in the switch 10 of the present invention and float the switch with respect to ground. In this case, the circuitry of the present invention may remain unchanged, or block 22 and its associated common mode signal may be eliminated if oscillation is provided to differential sensor 14 through a floating power supply 20 or other technique as set forth in application Ser. No. 340,183, filed Mar. 12, 1973, entitled "Touch Actuated Electronic Switch", in the name of one of the present inventors, now U.S. Pat. No. 3,862,432, issued on Jan. 21, 1975. It is preferred, however, even in this case to include a fixed connection between junction point 60 and a circuit reference, such as junction point 70 of power supply 20 now considered to be floating with respect to earth ground as by the removal of the connection between junction point 76 of power supply 20 and earth ground 46. This fixed connection 58 between input circuitry 15 and the remainder of the circuit has been found to provide more reliable actuation of the switch, although in the floating mode, no connection between junction point 60 and the remainder of the circuitry shown is necessary.

Now that the basic teachings of the present invention have been explained, many extensions and variations will be obvious to one having ordinary skill in the art. For example, the exclusive OR cirucit 14 specifically shown in FIG. 3 may be replaced by a circuit which is inverting or not inverting, as desired.

Also, circuitry which does not use MOS semiconductors, but transistors or other semiconductor or amplifying devices, is clearly usable in the switch 10 of the present invention. MOS devices are preferred because they may be integrated and thus fabricated in small size and because they offer a threshold of approximately one-half of the supply voltage applied. Further, MOS devices offer a high input impedance and accept extremely low levels of current which may eliminate the use of an additional amplifier or buffer amplifier if other devices are used for the exclusive OR circuit 14. That is, additional amplification or buffer amplifiers may be required prior to input circuitry 15 to sense the low level of current from the human operator or other object.

Additionally, the resistors shown in input circuitry 15 are generally intended as impedances as is shown clearly in FIG. 2 where the resistances have been replaced with capacitors of like number. Resistors, however, are preferred because of their ease of manufacture in small size.

Further, the output of the switch 10 of the present invention may be quite easily encoded, for example, by providing the output voltage available at junction point 176 in well known coded fashion to several multiple input amplifiers such as amplifier 18. Therefore, when several switches 10 of the present invention are to be located in a given area, such as on a keyboard, an encoded output may be obtained with fewer than one amplifier 18 for each pair of touch surfaces.

Furthermore, the switch 10 of the present invention will operate with a one wire input rather than the double wire input, 28 and 30, shown. It will be realized that this connection may require a balancing capacitor to the unconnected input to thus balance the capacitance of the wire from the sensor input to the touch surface.

Similarly, the switch 10 of the present invention could be operated in an inverse mode where it is purposefully unbalanced and a touch by the operator brings the unit into balance. The mode disclosed is preferred, however, for a much superior reliability.

Still further, the output of the switch 10 of the present invention may be taken from junction point 140 under certain circumstances, thus eliminating the necessity for the diode 178, capacitor 16, resistor 180, and the remaining circuitry associated with amplifier 18. An example of such a circumstance is if the device to be controlled operates during a time period which is quite small by comparison with the time period of the alternating voltage signal input to the switch 10. Such a device, for example, can be a computer which requires the energizing of a flip-flop circuit operating in nanoseconds. As is well known, a single 60 hertz pulse from the switch 10 of the present invention can effect such an energization and no further pulses are necessary and further pulses, as would be provided by the switch 10 of the present invention upon a continued touch of the operator, would not change the state of the flip-flop and thus would be ignored and not detrimental to circuit operation.

Thus, since the invention disclosed may be embodied in other specific forms without departing from the spirit or general characteristics thereof, some of which forms have been indicated, the embodiments described herein are to be considered in all respects illustrative and not restrictive. The scope of the invention is indicated by the appended claims, rather than by the foregoing description, and all changes which come within the meaning and range of equivalency of the claims are intended to be embraced therein.

What is claimed is:

1. A touch actuated electronic switch, comprising in combination: logic means including first signal input means and second signal input means for receiving signals to be compared and including signal output means for providing an output signal related to the differences in the input signal received; at least one touch surface; means for providing an electrical connection between the touch surface and an input means of the logic means; means for receiving an alternating voltage signal; means for providing an electrical connection between the receiving means and the logic means to provide a substantially balanced alternating voltage signal to the first and the second signal input means of the logic means; integrating means; and means for providing an electrical connection between the output means of the logic means and the integrating means.

2. The touch actuated electronic switch of claim 1, including impedance means connected as a shunting element between the input means of the logic means to provide increased noise suppression and sensitivity control.

3. The touch actuated electronic switch of claim 1, including amplifier means including signal input means for receiving a signal to be amplified and signal output means for providing an amplified signal output; and means for providing an electrical connection between the integrating means and the input means of the amplifier means.

4. The touch actuated electronic switch of claim 1, wherein the means for providing an electrical connection between the receiving means and the logic means includes first impedance means connected to the first signal input means and second impedance means connected to the second signal input means with the first and the second impedances having values which are balanced to provide the substantially balanced alternating voltage signal to the first and second signal input means of the logic means.

5. The touch actuated electronic switch of claim 4, wherein the impedance means comprise resistors.

6. The touch actuated electronic switch of claim 1, wherein the means for providing an electrical connection between the receiving means and the logic means comprises: first impedance means and second impedance means with the first impedance means and the second impedance means having values which are balanced to provide the substantially balanced alternating voltage signal to the first and second signal input means of the logic means; an electrical junction point; means for electrically connecting the first impedance means between the junction point and the first input means of the logic means; means for electrically connecting the second impedance means between the junction point and the second input means of the logic means; and means for providing an electrical connection between the junction point and the means for receiving the alternating voltage signal.

7. The touch actuated electronic switch of claim 6 wherein the first impedance means and the second impedance means comprise resistors.

8. The touch actuated electronic switch of claim 1, wherein the logic means comprises an exclusive OR logic circuit.

9. The touch actuated electronic switch of claim 8, wherein the logic means comprises MOS semiconductor devices to thereby provide a significant threshold for the switch.

10. The touch actuated electronic switch of claim 8, wherein the means for providing an electrical connection between the touch surface and an input means of the logic means comprises a twisted pair of wires with the twisted pair having a first end and a second end and with one wire of the first end connected to the first signal input means of the logic means and the second wire of the first end connected to the second signal input means of the logic means for better providing noise immunity and remote actuation for the switch.

11. The touch actuated electronic switch of claim 1, wherein the means for providing an electrical connection between the touch surface and an input means of the logic means comprises a twisted pair of wires with the twisted pair having a first end and a second end and with one wire of the first end connected to the first signal input means of the logic means and the second wire of the first end connected to the second signal input means of the logic means for better providing noise immunity and remote actuation for the switch.

12. The touch actuated electronic switch of claim 11, wherein the means for providing an electrical connection between the receiving means and the logic means includes first impedance means connected to the first signal input means and second impedance means connected to the second signal input means with the first and the second impedances having values which are balanced to provide the substantially balanced alternating voltage signal to the first and second signal input means of the logic means.

13. The touch actuated electronic switch of claim 12, wherein the impedance means comprise resistors.

14. The touch actuated electronic switch of claim 11, wherein the means for providing an electrical connection between the receiving means and the logic means comprises: first impedance means and second impedance means with the first impedance means and the second impedance means having values which are balanced to provide the substantially balanced alternating voltage signal to the first and second signal input means of the logic means; an electrical junction point; means for electrically connecting the first impedance means between the junction point and the first input means of the logic means; means for electrically connecting the second impedance means between the junction point and the second input means of the logic means; and means for providing an electrical connection between the junction point and the means for receiving the alternating voltage signal.

15. The touch actuated electronic switch of claim 11, including impedance means connected as a shunting element between the input means of the logic means to provide increased noise suppression and sensitivity control.

16. The touch actuated electronic switch of claim 15, wherein the logic means comprises MOS semiconductor devices to thereby provide a significant threshold for the switch.

17. The touch actuated electronic switch of claim 11, wherein the means for receiving an alternating voltage signal comprises means for receiving an alternating voltage signal at power frequencies.

18. The touch actuated electronic switch of claim 1, wherein the logic means comprises MOS semiconductor devices to thereby provide a significant threshold for the switch.

19. The touch actuated electronic switch of claim 18, including impedance means connected as a shunting element between the input means of the logic means to provide increased noise suppression and sensitivity control.

20. The touch actuated electronic switch of claim 18, wherein the means for providing an electrical connection between the receiving means and the logic means includes first impedance means connected to the first signal input means and second impedance means connected to the second signal input means with the first and the second impedances having values which are balanced to provide the substantially balanced alternating voltage signal to the first and second signal input means of the logic means.

21. The touch actuated electronic switch of claim 18, wherein the means for receiving an alternating voltage signal comprises means for receiving an alternating voltage signal at power frequencies.

22. The touch actuated electronic switch of claim 18, wherein the logic means comprises an exclusive OR logic circuit.

23. The touch actuated electronic switch of claim 22, wherein the means for providing an electrical connection between the touch surface and an input to the logic means comprises a twisted pair of wires with the twisted pair having a first end and a second end and with one wire of the first end connected to the first signal input means of the logic means and the second wire of the first end connected to the second signal input means of the logic means for better providing noise immunity and remote actuation for the switch.

24. The touch actuated electronic switch of claim 23, wherein the means for providing an electrical connection between the receiving means and the logic means comprises: first impedance means and second impedance means with the first impedance means and the second impedance means having values which are balanced to provide the substantially balanced alternating voltage signal to the first and second signal input means of the logic means; an electrical junction point; means for electrically connecting the first impedance means between the junction point and the first input means of the logic means; means for electrically connecting the second impedance means between the junction point and the second input means of the logic means; and means for providing an electrical connection between the junction point and the means for receiving the alternating voltage signal.

25. The touch actuated electronic switch of claim 24, wherein the first impedance means and the second impedance means comprise resistors.

26. The touch actuated electronic switch of claim 18, wherein the means for providing an electrical connection between the touch surface and an input means of the logic means comprises a twisted pair of wires with the twisted pair having a first end and a second end and with one wire of the first end connected to the first signal input means of the logic means and the second wire of the first end connected to the second signal input means of the logic means for better providing noise immunity and remote actuation for the switch.

27. The touch actuated electronic switch of claim 26, wherein the means for receiving an alternating voltage signal comprises means for receiving an alternating voltage signal at power frequencies.

28. The touch actuated electronic switch of claim 1, wherein the means for receiving an alternating voltage signal comprises means for receiving an alternating voltage signal at power frequencies.

29. The touch actuated electronic switch of claim 28, wherein the means for providing an electrical connection between the touch surface and an input means of the logic means comprises a twisted pair of wires with the twisted pair having a first end and a second end and with one wire of the first end connected to the first signal input means of the logic means and the second wire of the first end connected to the second signal input means of the logic means for better providing noise immunity and remote actuation for the switch.

30. The touch actuated electronic switch of claim 29, wherein the logic means comprises MOS semiconductor devices to thereby provide a significant threshold for the switch.

31. The touch actuated electronic switch of claim 30, wherein the logic means comprises an exclusive OR logic circuit.

32. The touch actuated electronic switch of claim 30, including impedance means connected as a shunting element between the input means of the logic means to provide increased noise suppression and sensitivity control.

33. The touch actuated electronic switch of claim 28, wherein the means for providing an electrical connection between the receiving means and the logic means comprises: first impedance means and second impedance means with the first impedance means and the second impedance means having values which are balanced to provide the substantially balanced alternating voltage signal to the first and second signal input means of the logic means; an electrical junction point; means for electrically connecting the first impedance means between the junction point and the first input means of the logic means; means for electrically connecting the second impedance means between the junction point and the second input means of the logic means; and means for providing an electrical connection between the junction point and the means for receiving the alternating voltage signal.

34. The touch actuated electronic switch of claim 33, wherein the means for providing an electrical connection between the touch surface and an input means of the logic means comprises a twisted pair of wires with the twisted pair having a first end and a second end and with one wire of the first end connected to the first signal input means of the logic means and the second wire of the first end connected to the second signal input means of the logic means for better providing noise immunity and remote actuation for the switch.

35. A touch actuated electronic switch, comprising in combination: exclusive OR logic means including first signal input means and second signal input means for receiving signals to be compared and including signal output means for providing an output signal related to the differences in the input signal received; at least one touch surface; means for providing an electrical connection between the touch surface and an input means of the logic means; means for receiving an alternating voltage signal; and means for providing an electrical connection between the receiving means and the logic means to provide a substantially balanced alternating voltage signal to the first and the second signal input means of the logic means.

36. The touch actuated electronic switch of claim 35, including: integrating means; and means for providing an electrical connection between the output means of the logic means and the integrating means.

37. The touch actuated electronic switch of claim 36, wherein the integrating means includes a capacitor and wherein the means for providing an electrical connection between the output means of the logic means and the integrating means includes unidirectional conduction means.

38. The touch actuated electronic switch of claim 36, wherein the means for providing an electrical connection between the receiving means and the logic means includes first impedance means connected to the first signal input means and second impedance means connected to the second signal input means with the first and the second impedances having values which are balanced to provide the substantially balanced alternating voltage signal to the first and second signal input means of the logic means.

39. The touch actuated electronic switch of claim 38, wherein the impedance means comprise resistors.

40. The touch actuated electronic switch of claim 36, wherein the means for providing an electrical connection between the receiving means and the logic means comprises: first impedance means and second impedance means with the first impedance means and the second impedance means having values which are balanced to provide the substantially balanced alternating voltage signal to the first and second signal input means of the logic means, an electrical junction point; means for electrically connecting the first impedance means between the junction point and the first input means of the logic means; means for electrically connecting the second impedance means between the junction point and the second input means of the logic means; and means for providing an electrical connection between the junction point and the means for receiving the alternating voltage signal.

41. The touch actuated electronic switch of claim 36, wherein the means for providing an electrical connection between the touch surface and an input means of the logic means comprises a twisted pair of wires with the twisted pair having a first end and a second end and with one wire of the first end connected to the first signal input means of the logic means and the second wire of the first end connected to the second signal input means of the logic means for better providing noise immunity and remote actuation for the switch.

42. The touch actuated electronic switch of claim 36, wherein the means for receiving an alternating voltage signal comprises means for receiving an alternating voltage signal at power frequencies.

43. The touch actuated electronic switch of claim 36, wherein the logic means comprises MOS semiconductor devices to thereby provide a significant threshold for the switch.

44. The touch actuated electronic switch of claim 35, wherein the means for providing an electrical connection between the touch surface and an input means of the logic means comprises a twisted pair of wires with the twisted pair having a first end and a second end and with one wire of the first end connected to the first signal input means of the logic means and the second wire of the first end connected to the second signal input means of the logic means for better providing noise immunity and remote actuation for the switch.

45. The touch actuated electronic switch of claim 44, wherein the means for receiving an alternating voltage signal comprises means for receiving an alternating voltage signal at power frequencies.

46. The touch actuated electronic switch of claim 44, wherein the means for providing an electrical connection between the receiving means and the logic means includes first impedance means connected to the first signal input means and second impedance means connected to the second signal input means with the first and the second impedances having values which are balanced to provide the substantially balanced alternating voltage signal to the first and second signal input means of the logic means.

47. The touch actuated electronic switch of claim 46, wherein the impedance means comprise resistors.

48. The touch actuated electronic switch of claim 44, wherein the means for providing an electrical connection between the receiving means and the logic means comprises: first impedance means and second impedance means with the first impedance means and the second impedance means having values which are balanced to provide the substantially balanced alternating voltage signal to the first and second signal input means of the logic means; an electrical junction point; means for electrically connecting the first impedance means between the junction point and the first input means of the logic means; means for electrically connecting the second impedance means between the junction point and the second input means of the logic means; and means for providing an electrical connection between the junction point and the means for receiving the alternating voltage signal.

49. The touch actuated electronic switch of claim 48, wherein the means for receiving an alternating voltage signal comprises means for receiving an alternating voltage signal at power frequencies.

50. The touch actuated electronic switch of claim 44, wherein the logic means comprises MOS semiconductor devices to thereby provide a significant threshold for the switch.

51. The touch actuated electronic switch of claim 44, including: integrating means including a capacitor; and means for providing an electrical connection between the output means of the logic means and the integrating means including unidirectional conduction means.

52. The touch actuated electronic switch of claim 35, wherein the logic means comprises MOS semiconductor devices to thereby provide a significant threshold for the switch.

53. The touch actuated electronic switch of claim 52, including: integrating means including a capacitor; and means for providing an electrical connection between the output means of the logic means and the integrating means including unidirectional conduction means.

54. The touch actuated electronic switch of claim 53, wherein the means for providing an electrical connection between the receiving means and the logic means includes first impedance means connected to the first signal input means and second impedance means connected to the second signal input means with the first and the second impedances having values which are balanced to provide the substantially balanced alternating voltage signal to the first and second signal input means of the logic means.

55. The touch actuated electronic switch of claim 54, wherein the impedance means comprise resistors.

56. The touch actuated electronic switch of claim 52, wherein the means for receiving an alternating voltage signal comprises means for receiving an alternating voltage signal at power frequencies.

57. The touch actuated electronic switch of claim 56, wherein the means for providing an electrical connection between the touch surface and an input means of the logic means comprises a twisted pair of wires with the twisted pair having a first end and a second end and with one wire of the first end connected to the first signal input means of the logic means and the second wire of the first end connected to the second signal input means of the logic means for better providing noise immunity and remote actuation for the switch.

58. The touch actuated electronic switch of claim 52, wherein the means for providing an electrical connection between the receiving means and the logic means comprises: first impedance means and second impedance means with the first impedance means and the second impedance means having values which are balanced to provide the substantially balanced alternating voltage signal to the first and second signal input means of the logic means; an electrical junction point; means for electrically connecting the first impedance means between the junction point and the first input means of the logic means; means for electrically connecting the second impedance means between the junction point and the second input means of the logic means; and means for providing an electrical connection between the junction point and the means for receiving the alternating voltage signal.

59. The touch actuated electronic switch of claim 58, wherein the first impedance means and the second impedance means comprise resistors.

60. The touch actuated electronic switch of claim 58, wherein the means for receiving an alternating voltage signal comprises means for receiving an alternating voltage signal at power frequencies.

61. The touch actuated electronic switch of claim 58, wherein the means for providing an electrical connection between the touch surface and an input means of the logic means comprises a twisted pair of wires with the twisted pair having a first end and a second end and with one wire of the first end connected to the first signal input means of the logic means and the second wire of the first end connected to the second signal input means of the logic means for better providing noise immunity and remote actuation for the switch.

62. The touch actuated electronic switch of claim 35, wherein the means for receiving an alternating voltage signal comprises means for receiving an alternating voltage signal at power frequencies.

63. The touch actuated electronic switch of claim 62, including: integrating means including a capacitor; and means for providing an electrical connection between the output means of the logic means and the integrating means including unidirectional conduction means.

64. The touch actuated electronic switch of claim 63, wherein the means for providing an electrical connection between the touch surface and an input means of the logic means comprises a twisted pair of wires with the twisted pair having a first end and a second end and with one wire of the first end connected to the first signal input means of the logic means and the second wire of the first end connected to the second signal input means of the logic means for better providing noise immunity and remote actuation for the switch.

65. The touch actuated electronic switch of claim 62, wherein the means for providing an electrical connection between the receiving means and the logic means comprises: first impedance means and second impedance means with the first impedance means and the second impedance means having values which are balanced to provide the substantially balanced alternating voltage signal to the first and second signal input means of the logic means; an electrical junction point; means for electrically connecting the first impedance means between the junction point and the first input means of the logic means; means for electrically connecting the second impedance means between the junction point and the second input means of the logic means; and means for providing an electrical connection between the junction point and the means for receiving the alternating voltage signal.

* * * * *